(12) United States Patent
Joung et al.

(10) Patent No.: US 9,042,483 B2
(45) Date of Patent: May 26, 2015

(54) APPARATUS AND METHOD OF COMPENSATING FOR I/Q IMBALANCE IN DIRECT UP-CONVERSION SYSTEM

(75) Inventors: Jinsoup Joung, Seongnam-si (KR);
Seunghwan Ji, Seongnam-si (KR);
Yonghoon Lim, Seoul (KR);
Byungkwan Jang, Yongin-si (KR)

(73) Assignee: INNOWIRELESS CO., LTD. (KR)

( * ) Notice: Subject to any disclaimer, the term of this patent is extended or adjusted under 35 U.S.C. 154(b) by 0 days.

(21) Appl. No.: 14/355,941

(22) PCT Filed: Apr. 30, 2012

(86) PCT No.: PCT/KR2012/003330
§ 371 (c)(1),
(2), (4) Date: May 2, 2014

(87) PCT Pub. No.: WO2013/077507
PCT Pub. Date: May 30, 2013

(65) Prior Publication Data
US 2014/0294057 A1      Oct. 2, 2014

(30) Foreign Application Priority Data
Nov. 22, 2011  (KR) ................. 10-2011-0121980

(51) Int. Cl.
H04K 1/02      (2006.01)
H04B 1/04      (2006.01)
H04L 27/36     (2006.01)
H04L 27/26     (2006.01)

(52) U.S. Cl.
CPC .......... *H04B 1/0475* (2013.01); *H04L 27/2627* (2013.01); *H04L 27/364* (2013.01)

(58) Field of Classification Search
CPC . H04B 1/76; H04B 3/04–3/18; H04B 1/0475; H04B 1/62–1/64; H04B 14/004; H04B 1/00; H04B 1/0003; H04B 1/005; H04B 1/0458; H04B 1/72
See application file for complete search history.

(56) References Cited

U.S. PATENT DOCUMENTS

| | | | |
|---|---|---|---|
| 8,094,054 B2 * | 1/2012 | Helfenstein et al. | 341/144 |
| 2002/0050372 A1 | 5/2002 | Lee | |
| 2004/0219884 A1 * | 11/2004 | Mo et al. | 455/67.11 |
| 2010/0289572 A1 | 11/2010 | Li et al. | |
| 2014/0286382 A1 * | 9/2014 | Dark | 375/227 |

FOREIGN PATENT DOCUMENTS

| | | |
|---|---|---|
| KR | 1020010064260 | 7/2001 |
| KR | 1020100124216 | 11/2010 |
| WO | 03021826 | 3/2003 |

OTHER PUBLICATIONS

Carolina Luque A. et al., Improved Dynamic Range for Multi-Tone Signal Using Model-Based Pre-distortion, Metrology and Measurement Systems, 2009, pp. 129-141.
International Search Report-PCT/KR2012/003330 dated Nov. 26, 2012.

* cited by examiner

*Primary Examiner* — Dac Ha
(74) *Attorney, Agent, or Firm* — Cantor Colburn LLP

(57) ABSTRACT

An apparatus and a method of compensating for an I/Q imbalance in a direct up-conversion system prevents the performance of the system from being deteriorated by efficiently compensating for an I/Q timing skew, an I/Q phase imbalance, and an I/Q gain imbalance by using a characteristic of an OFDM scheme in an Orthogonal Frequency Domain Multiple (Access) (OFDM(A)) system using a direct up-conversion scheme. According to the apparatus and the method of compensating for an I/Q imbalance in the direct up-conversion system of the present invention, an OFDM(A) system using a direct up-conversion scheme may efficiently compensate for I/Q timing skew, I/Q phase imbalance, and I/Q gain imbalance by using a characteristic of an OFDMA scheme, so that a performance of the system is prevented from being deteriorated.

11 Claims, 3 Drawing Sheets

APPARATUS AND METHOD OF COMPENSATING FOR I/Q IMBALANCE IN DIRECT UP-CONVERSION SYSTEM

TECHNICAL FIELD

The present invention relates to an apparatus and a method of compensating for an In-phase/Quadrature-phase (I/Q) imbalance in a direct up-conversion system, and more particularly to an apparatus and a method of compensating for an I/Q imbalance in a direct up-conversion system, by which an Orthogonal Frequency Domain Multiple (Access) (OFDM (A)) system using a direct up-conversion scheme efficiently compensates for an I/Q timing skew, an I/Q phase imbalance, and an I/Q gain imbalance by using a characteristic of an OFDM scheme, thereby preventing the performance of the system from being deteriorated.

BACKGROUND ART

A direct or homodyne up-conversion scheme is one of the conversion techniques widely used in various types of communication systems due to its convenience and economic feasibility. FIG. 1 is a block diagram schematically illustrating a conventional direct up-conversion system.

According to a schematic operation of the conventional direct up-conversion system illustrated in FIG. 1, the conventional direct up-conversion system converts a digital baseband I signal and a digital baseband Q signal to an analog I signals and Q signals through a Digital to Analog Converter (DAC), respectively, removes a high frequency component from the analog I signals and Q signals by using a Low Pass Filter (LPF), and frequency modulates the I and Q baseband signals passing the LPF to Radio Frequency (RF) signals by using an I/Q modulator that is an analog device.

In the meantime, the I/Q modulator has an in-phase component I and a quadrature-phase component Q, in which I should accurately lie at right angles of 90° to Q. However, according to the direct up-conversion system, a phase imbalance that a phase between the in-phase component I and the quadrature-phase component Q is not 90° and a gain imbalance that a gain between the in-phase component I and the quadrature-phase component Q is differentiated are generated due to the characteristic of the I/Q modulator that is the analog device, so that the conventional up-conversion system has a disadvantage of the serious performance deterioration.

FIG. 2 is a graph illustrating an influence by phase/gain imbalance between the in-phase component I and the quadrature-phase component Q. As illustrated in FIG. 2, in a case where the phase/gain imbalance is generated between the in-phase component I and the quadrature-phase component Q, when a reception terminal demodulates a corresponding signal, a performance is seriously deteriorated by a mirror spectrum component. Accordingly, many techniques for measuring and correcting the I/Q phase/gain imbalance have been researched.

However, a technique for measuring and correcting an I/Q timing skew resulting from a delay time difference between I and Q components generated by a difference of DAC timings or PCB or cable lengths between I and Q components has not been researched much until recently. In this respect, in an OFDM communication system, such as actively used Wireless Local Area Network (WLAN), Worldwide Interoperability for Microwave Access (WiMAX), or Long-Term Evolution (LTE) in recent days, using a broadband, a performance of the system is deteriorated due to the I/Q timing skew.

In consideration of the performance deterioration of the system, a conventional and general I/Q imbalance compensation method used in the direct up-conversion system employing the OFDM(A) employs a method of removing the I/Q imbalance in a final output terminal of the direct up-conversion system by measuring I/Q imbalance factor values of the direct up-conversion system and then inversely pre-distorting the measured I/Q imbalance factor values by a transmission unit. A method of measuring the I/Q timing skew, the I/Q phase imbalance, and the I/Q gain imbalance, which are the I/Q imbalance factors, is dealt with in another patent application of an invention different from the present invention, so that the description of the present invention is progressed based on an assumption that one has been aware of the I/Q timing skew, the I/Q phase imbalance, and the I/Q gain imbalance.

FIG. 3 is a block diagram schematically illustrating an I/Q imbalance compensation apparatus in the conventional direct up-conversion system. As illustrated in FIG. 3, the I/Q imbalance compensation apparatus in the conventional direct up-conversion system pre-distorts the I/Q phase imbalance and the I/Q gain imbalance in a digital terminal of a baseband signal by using the I/Q imbalance factors. However, even in this case, the pre-distortion is performed without the consideration of the I/Q timing skew, so that the efficiency of the pre-distortion is decreased.

FIG. 4 is a block diagram schematically illustrating an I/Q imbalance compensation apparatus in the conventional direct up-conversion system which performs the pre-distortion in consideration the I/Q timing skew in addition to the I/Q phase imbalance and the I/Q gain imbalance. However, it is also very difficult for the I/Q imbalance compensation apparatus of FIG. 4 to compensate for the I/Q timing skew in a baseband of a time domain.

DISCLOSURE

Technical Problem

Accordingly, the present invention has been made to solve the above-mentioned problems occurring in the prior art, and an aspect of the present invention is to provide an apparatus and a method of compensating for an I/Q imbalance in a direct up-conversion system, by which an OFDM(A) system using a direct up-conversion scheme efficiently compensates for I/Q timing skew, I/Q phase imbalance, and I/Q gain imbalance by using a characteristic of an OFDMA scheme, thereby preventing a performance of the system from being deteriorated.

Technical Solution

In accordance with an aspect of the present invention, there is provided an In-phase/Quadrature-phase (I/Q) imbalance compensation apparatus in a direct up-conversion system, including: a pre-distortion factor calculator for fetching pre-measured I/Q imbalance factors and calculating pre-distortion factors A, B, C, and D; and a pre-distortion executer for executing a pre-distortion for each subcarrier through the distortion factors A, B, C, and D corresponding to each sub-carrier, wherein the pre-distortion factors A, B, C, and D are calculated by following equations, $$Phase_{timing\_skew} = 2*\pi*\left(\text{subcarrier index} - \left(\frac{N}{2} - 1\right)\right)*\Delta f*\tau$$

$$\frac{N}{2} \leq \text{subcarrier index} < N \text{ Point } FFT$$

-continued $$A = 0.5 * [(1+g) * \cos(\phi) + (1-g) +$$
$$\cos(\phi) * \cos(Phase_{timing\_skew}) - (1+g) * \sin(\phi) * \sin(Phase_{timing\_skew})]$$
$$B = 0.5 * [(g-1) * \sin(\phi) + (1-g) + \cos(\phi) * \sin(Phase_{timing\_skew}) +$$
$$(1+g) * \sin(\phi) * \cos(Phase_{timing\_skew})]$$
$$C = 0.5 * [(1+g) * \cos(\phi) - (1-g) + \cos(\phi) * \cos(Phase_{timing\_skew}) -$$
$$(1+g) * \sin(\phi) * \sin(Phase_{timing\_skew})]$$
$$D = 0.5 * [(g-1) * \sin(\phi) + (1-g) + \cos(\phi) * \sin(Phase_{timing\_skew}) -$$
$$(1+g) * \sin(\phi) * \cos(Phase_{timing\_skew})],$$

in which τ indicates IN timing skew, g indicates an I/Q gain imbalance, Φ indicates an I/Q phase imbalance, Δf indicates sampling rate/FFT size, and N indicates an FFT size.

According to the present invention, the direct up-conversion system is applied to an Orthogonal Frequency Domain Multiple (OFDM) system.

In the meantime, the I/Q imbalance compensation apparatus further includes a pre-distortion factor storage unit for storing the pre-distortion factors calculated by the pre-distortion factor calculator, and the pre-distortion executer fetches the pre-distortion factors calculated by the pre-distortion factor calculator to execute the pre-distortion.

The pre-distortion executer performs the pre-distortion for respective subcarriers bilaterally symmetric to each other with respect to a DC subcarrier, and the pre-distortion is performed by $$Predistorted\_I(f_m) = A(f_m) \cdot I(f_m) + B(f_m) \cdot Q(f_m) + C(f_m) \cdot I(f_{-m}) + D(f) \cdot Q(f_{-m})$$

$$Predistorted\_Q(f_m) = A(f_m) \cdot Q(f_m) - B(f_m) \cdot I(f_m) + D(f_m) \cdot I(f_{-m}) - C(f) \cdot Q(f_{-m})$$

and $$Predistorted\_I(f_{-m}) = A(f_{-m}) \cdot I(f_{-m}) + B(f_{-m}) \cdot Q(f_{-m}) + C(f_{-m}) \cdot I(f_m) + D(f_{-m}) \cdot Q(f_m)$$

$$Predistorted\_Q(f_{-m}) = A(f_{-m}) \cdot Q(f_{-m}) - B(f_{-m}) \cdot I(f_{-m}) + D(f_{-m}) \cdot I(f_m) - C(f_{-m}) \cdot Q(f_m),$$

in which $f_m$ indicates a predetermined subcarrier index, and $f_{-m}$ indicates a subcarrier index symmetric to $f_m$.

In accordance with another aspect of the present invention, there is provided a direct up-conversion system including: the I/Q imbalance compensation apparatus for performing a pre-distortion so as to compensate for an I/Q imbalance for baseband digital I signals and baseband digital Q signals; a baseband processor including an IFFT (Inverse Fast Fourier Transformation) unit for performing an IFFT on I signals and Q signals pre-distorted by the I/Q imbalance compensation apparatus; a D/A converter for converting analog I signals and Q signals which have undergone the IFFT to digital data; and an I/Q modulator for I/Q modulating the digital data.

In accordance with another aspect of the present invention, there is provided a method of compensating for an I/Q imbalance in a direct up-conversion system, the method including the steps of: (a) calculating pre-distortion factors A, B, C, and D for each subcarrier by using pre-measured I/Q gain imbalance g, I/Q phase imbalance Φ, and I/Q timing skew τ (timing_skew); (b) executing a pre-distortion for each subcarrier through the calculated pre-distortion factors A, B, C, and D for each subcarrier; (c) performing an IFFT on pre-distorted I/Q signals; and (d) converting analog I signals and Q signals which have undergone an IFFT to digital data and I/Q modulating the digital data, wherein the pre-distortion factors A, B, C, and D are calculated by following equations, $$Phase_{timing\_skew} = 2 * \pi * \left(\text{subcarrier index} - \left(\frac{N}{2} - 1\right)\right) * \Delta f * \tau$$

$$\frac{N}{2} \leq \text{subcarrier index} < N \text{ Point } FFT$$

$$A = 0.5 * [(1+g) * \cos(\phi) + (1-g) +$$
$$\cos(\phi) * \cos(Phase_{timing\_skew}) - (1+g) * \sin(\phi) * \sin(Phase_{timing\_skew})]$$
$$B = 0.5 * [(g-1) * \sin(\phi) + (1-g) + \cos(\phi) * \sin(Phase_{timing\_skew}) +$$
$$(1+g) * \sin(\phi) * \cos(Phase_{timing\_skew})]$$
$$C = 0.5 * [(1+g) * \cos(\phi) - (1-g) + \cos(\phi) * \cos(Phase_{timing\_skew}) -$$
$$(1+g) * \sin(\phi) * \sin(Phase_{timing\_skew})]$$
$$D = 0.5 * [(g-1) * \sin(\phi) + (1-g) + \cos(\phi) * \sin(Phase_{timing\_skew}) -$$
$$(1+g) * \sin(\phi) * \cos(Phase_{timing\_skew})],$$

in which τ indicates I/Q timing skew, g indicates an I/Q gain imbalance, Φ indicates an I/Q phase imbalance, Δf indicates sampling rate/FFT size, and N indicates an FFT size.

In the aforementioned construction, the method further includes a step of storing the pre-distortion factors calculated in the step of (a) before the step of (b), wherein the step of (b) is performed by fetching the stored pre-distortion factors.

The step of (b) is performed for respective subcarriers bilaterally symmetric to each other with respect to a DC subcarrier, and the pre-distortion is performed by $$Predistorted\_I(f_m) = A(f_m) \cdot I(f_m) + B(f_m) \cdot Q(f_m) + C(f_m) \cdot I(f_{-m}) + D(f) \cdot Q(f_{-m})$$

$$Predistorted\_Q(f_m) = A(f_m) \cdot Q(f_m) - B(f_m) \cdot I(f_m) + D(f_m) \cdot I(f_{-m}) - C(f) \cdot Q(f_{-m})$$

and $$Predistorted\_I(f_{-m}) = A(f_{-m}) \cdot I(f_{-m}) + B(f_{-m}) \cdot Q(f_{-m}) + C(f_{-m}) \cdot I(f_m) + D(f_{-m}) \cdot Q(f_m)$$

$$Predistorted\_Q(f_{-m}) = A(f_{-m}) \cdot Q(f_{-m}) - B(f_{-m}) \cdot I(f_{-m}) + D(f_{-m}) \cdot I(f_m) - C(f_{-m}) \cdot Q(f_m),$$

in which $f_m$ indicates a predetermined subcarrier index, and $f_{-m}$ indicates a subcarrier index symmetric to $f_m$.

The method is applied to an OFDM system.

Advantageous Effects

According to the apparatus and the method of compensating for an I/Q imbalance in the direct up-conversion system of the present invention, an OFDM(A) system using a direct up-conversion scheme may efficiently compensate for I/Q timing skew, I/Q phase imbalance, and I/Q gain imbalance by using a characteristic of an OFDMA scheme, so that a performance of the system is prevented from being deteriorated.

MODE FOR INVENTION

Hereinafter, an exemplary embodiment of an apparatus and a method of compensating for an I/Q imbalance in a direct up-conversion system of the present invention will be described with reference to the accompanying drawings in detail.

Figure 1:
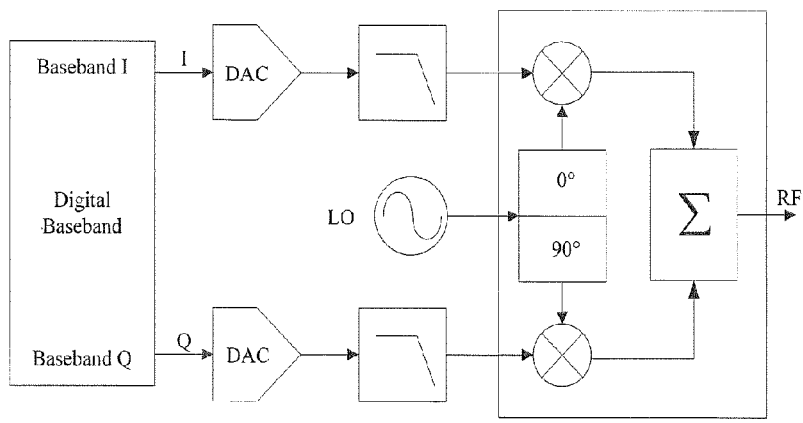
FIG. 1 is a block diagram schematically illustrating a conventional direct up-conversion system.
Figure 2:
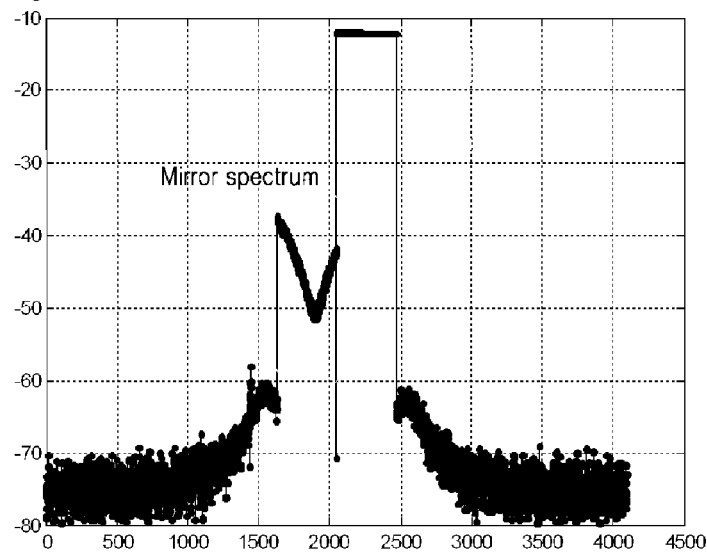
FIG. 2 is a graph illustrating an influence by phase/gain imbalance between in-phase component I and quadrature-phase component Q.
Figure 3:
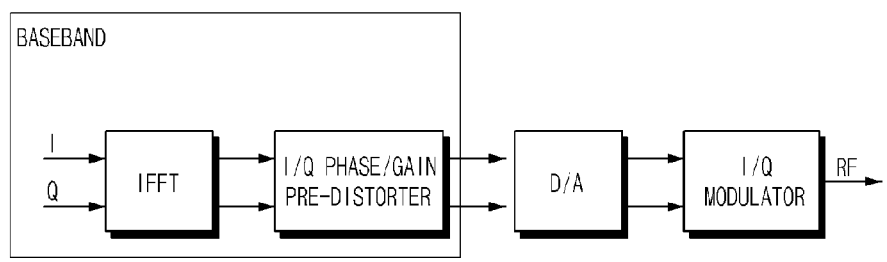
FIG. 3 is a block diagram schematically illustrating an I/Q imbalance compensation apparatus in the conventional direct up-conversion system.
Figure 4:
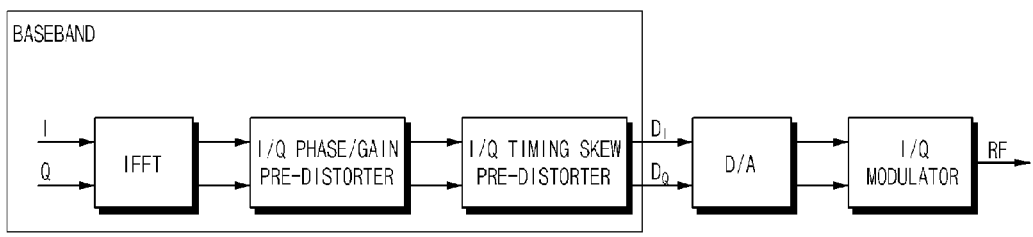
FIG. 4 is a block diagram schematically illustrating an I/Q imbalance compensation apparatus in the conventional direct up-conversion system which performs the pre-distortion in consideration the I/Q timing skew in addition to the I/Q phase imbalance and the I/Q gain imbalance.

First, when it is assumed that an I/Q gain imbalance is g, an I/Q phase imbalance is Φ, and an I/Q timing skew is τ (timing_skew), which are measured in the direct up-conversion system, the pre-distorted baseband signal in FIG. 3 may be expressed as Equation 1.

$$D_I(t) = (1+g)\cos\phi \cdot I(t) - (1-g)\sin\phi \cdot Q(t)$$

$$D_Q(t) = (1-g)\cos\phi \cdot Q(t-\tau) - (1+g)\sin\phi \cdot I(t-\tau) \quad \text{[Equation 1]}$$

*40 In Equation 1, if $Y(t) = D_I(t) + jD_Q(t)$, $x(t) = I(t) + jQ(t)$, y(t) may be expressed as Equation 2.

$$y(t) = \frac{1}{2}\left\{\begin{array}{l}(1+g)\cos\phi[x(t)+x^*(t)] - (1-g)\sin\phi\left[\dfrac{x(t)-x^*(t)}{j}\right] + \\ j\left[(1-g)\cos\phi\left(\dfrac{x(t-\tau)-x^*(t-\tau)}{j}\right) - \right. \\ \left. (1+g)\sin\phi(x(t-\tau)+x^*(t-\tau))\right]\end{array}\right\} \quad \text{[Equation 2]}$$

In Equation 2, Fast Fourier Transform (FFT) is performed on y(t), it may be expressed as Equation 3, and Equation 3 is organized as Equation 4.

$$FFT\{y(t)\} = \tfrac{1}{2}\{(1+g)\cos\phi[X(\omega)+X^*(-\omega)]+j(1-g)\sin\phi[X(\omega)-X^*(-\omega)]+(1-g)\cos\phi[X(\omega)-X^*(-\omega)]e^{-j\omega\tau} - j(1+g)\sin\phi[X(\omega)+X^*(\omega)]e^{-j\omega\tau}\} \quad \text{[Equation 3]}$$

$$Y(\omega) = \tfrac{1}{2}\{[((1+g)+(1-g)e^{-j\omega\tau})\cos\phi + j(1-g)-(1+g)e^{-j\omega\tau})\sin\phi]X(\omega) + [((1+g)-(1-g)e^{-j\omega\tau})\cos\phi - j((1-g)+(1+g)e^{-j\omega\tau})\sin\phi]X^*(-\omega)\} \quad \text{[Equation 4]}$$

In the meantime, if $Y(\omega) = I(\omega) + jQ(\omega)$, a pre-distorted baseband signal in a frequency domain may be expressed as Equation 5. That is, the OFDM system using the direct up-conversion scheme performs the pre-distortion of the I/Q imbalance of the I/Q phase/gain/timing skew before an Inverse Fast Fourier Transform (IFFT), i.e. in the frequency domain, so that the OFDM system may easily compensate for all I/Q imbalance factors.

$$\text{predistort}_I(\omega) = A \cdot I(\omega) + B \cdot Q(\omega) + C \cdot I(-\omega) + D \cdot Q(-\omega)$$

$$\text{predistort}_Q(\omega) = -B \cdot I(\omega) + A \cdot Q(\omega) + D \cdot I(-\omega) - C \cdot Q(-\omega) \quad \text{[Equation 5]}$$

Figure 5:
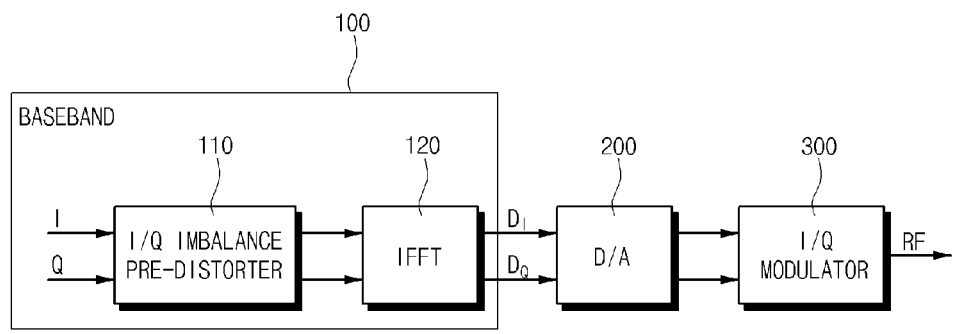
FIG. 5 is a block diagram illustrating an entire construction of a direct up-conversion system including an apparatus for compensating for an I/Q imbalance of the present invention.

$A = (1+g)\cos\phi + (1-g)\cos\phi \cdot \cos\omega\tau - (1+g)\sin\phi \cdot \sin\omega\tau$
$B = (g-1)\sin\phi + (1-g)\cos\phi \cdot \sin\omega\tau + (1+g)\sin\phi \cdot \cos\omega\tau$
$C = (1+g)\cos\phi - (1-g)\cos\phi \cdot \cos\omega\tau - (1+g)\sin\phi \cdot \sin\omega\tau$
$D = (g-1)\sin\phi + (1-g)\cos\phi \cdot \sin\omega\tau - (1+g)\sin\phi \cdot \cos\omega\tau$ FIG. 5 is a block diagram illustrating an entire construction of the direct up-conversion system including the apparatus for compensating for the I/Q imbalance of the present invention, in which the I/Q imbalance is pre-distorted in the frequency domain. As illustrated in FIG. 5, the direct up-conversion system including the apparatus for compensating for the I/Q imbalance of the present invention generally includes a baseband processor 100 including an I/Q imbalance pre-distorter 110 for performing a pre-distortion so as to compensate for the I/Q imbalance for baseband digital I signals and baseband digital Q signals and an IFFT unit 120 for performing an IFFT for the I signal and the Q signal pre-distorted in the I/Q imbalance pre-distorter 110, a D/A converter 200 for converting analog I signals and Q signals which have undergone the IFFT after the pre-distortion to digital data, and an I/Q modulator 300 for modulating the digital data through an I/Q modulator.

Figure 6:
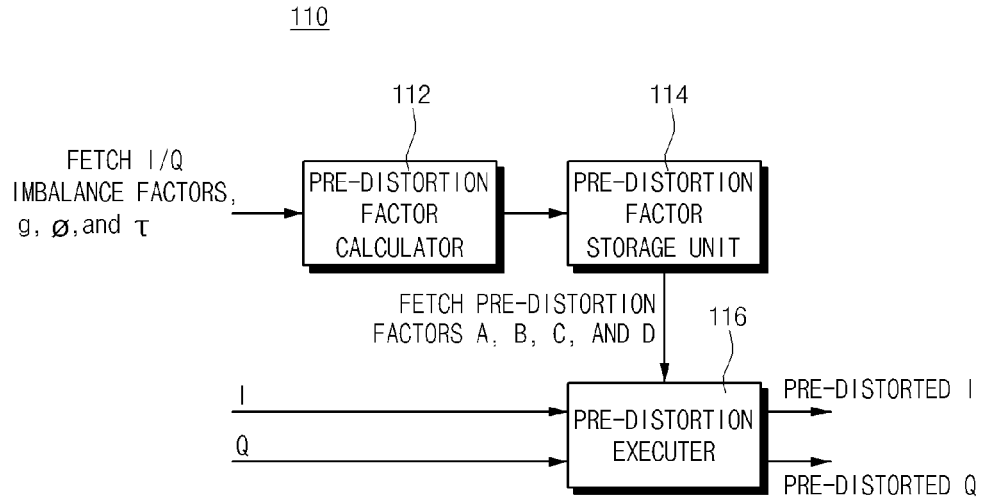
FIG. 6 is a block diagram illustrating a detailed function of an I/Q imbalance pre-distorter of FIG. 5.

FIG. 6 is a block diagram illustrating a detailed function of the I/Q imbalance pre-distorter of FIG. 5. As illustrated in FIG. 6, the I/Q imbalance pre-distorter 110 of the present invention serves to pre-distort the I/Q imbalance in the frequency domain which is before the IFFT, and generally includes a pre-distortion factor calculator 112, a pre-distortion factor storage unit 114, and a pre-distortion executer 116.

Among the aforementioned constructions, the pre-distortion factor calculator 112 functions to calculate factors A, B, C, and D of Equation 5 by fetching pre-measured I/Q imbalance factors and store the calculated values of factors A, B, C, and D in the pre-distortion factor storage unit 114. In the OFDM scheme, subcarriers have inherent frequency values, and the respective subcarriers are spaced apart from each other in the frequency domain by a subcarrier spacing, Δf (=sampling rate/FFT size). Accordingly, since the frequency components ω of the respective subcarriers become different in Equation 5, the respective subcarriers have the different values of factors A, B, C, and D, so that if the values of factors A, B, C, and D are calculated for each subcarrier every time, a quantity of calculation is increased. Accordingly, in the present invention, g, Φ, and τ (timing_skew), which are the I/Q imbalance factors of the direct up-conversion system, are hardware dependent values, so that the present invention uses a fact that g, Φ, and τ (timing_skew) have inherent values unless the hardware of the system is changed.

That is, when one direct up-conversion system is configured, the system has inherent values of g, Φ, and τ (timing_skew), so that the pre-distortion factor calculator 112 calculates the factors A, B, C, and D once, and stores the calculated values of factors A, B, C, and D in the pre-distortion factor storage unit 114. The values of factors A, B, C, and D may be calculated by Equation 6.

$$Phase_{timing\_skew} = \quad \text{[Equation 6]}$$

$$2 * \pi * \left(\text{subcarrier index} - \left(\frac{N}{2}-1\right)\right) * \Delta f * \tau$$

$$\frac{N}{2} \le \text{subcarrier index} < N \text{ Point } FFT$$

$$A = 0.5 * [(1+g) * \cos(\phi) + (1-g) + \cos(\phi) *$$

$$\cos(Phase_{timing\_skew}) - 1 + g) *$$

$$\sin(\phi) * \sin(Phase_{timing\_skew})]$$

-continued
$$B = 0.5 * [(g-1)*\sin(\phi) + (1-g) +$$
$$\cos(\phi)*\sin(Phase_{timing\_skew}) +$$
$$(1+g)*\sin(\phi)*\cos(Phase_{timing\_skew})]$$
$$C = 0.5 * [(1+g)*\cos(\phi) - (1-g) +$$
$$\cos(\phi)*\cos(Phase_{timing\_skew}) -$$
$$(1+g)*\sin(\phi)*\sin(Phase_{timing\_skew})]$$
$$D = 0.5 * [(g-1)*\sin(\phi) + (1-g) +$$
$$\cos(\phi)*\sin(Phase_{timing\_skew}) -$$
$$(1+g)*\sin(\phi)*\cos(Phase_{timing\_skew})]$$

The pre-distortion factor storage unit 114 functions to store the values of factors A, B, C, and D in a number equal to the number of subcarriers calculated in the pre-distortion factor calculator 112 in a memory. Next, the pre-distortion executer 116 functions to fetch the values of factors A, B, C, and D corresponding to each subcarrier from the pre-distortion factor storage unit 114 and execute the pre-distortion for each subcarrier. The pre-distortion in the frequency domain is performed with the subcarriers bilaterally symmetric to each other with respect to a DC subcarrier, and the pre-distortion may be expressed as Equation 7.

$$\text{Predistorted\_}I(f_m) = A(f_m)\cdot I(f_m) + B(f_m)\cdot Q(f_m) + C(f_m)\cdot I(f_{-m}) + D(f)\cdot Q(f_{-m})$$

$$\text{Predistorted\_}Q(f_m) = A(f_m)\cdot Q(f_m) - B(f_m)\cdot I(f_m) + D(f_m)\cdot I(f_{-m}) - C(f)\cdot Q(f_{-m})$$
[Equation 7]

Further, in Equation 7, if a subcarrier index, which is symmetric to a predetermined subcarrier index $f_m$, is $f_{-m}$, the pre-distorted baseband I/Q signals of the subcarrier index $f_m$ may be expressed as Equation 8.

$$\text{Predistorted\_}I(f_{-m}) = A(f_{-m})\cdot I(f_{-m}) + B(f_{-m})\cdot Q(f_{-m}) + C(f_{-m})\cdot I(f_m) + D(f_{-m})\cdot Q(f_m)$$

$$\text{Predistorted\_}Q(f_{-m}) = A(f_{-m})\cdot Q(f_{-m}) - B(f_{-m})\cdot I(f_{-m}) + D(f_{-m})\cdot I(f_m) - C(f_{-m})\cdot Q(f_m)$$
[Equation 8]

Hereinafter, a method of compensating for an I/Q imbalance in the direct up-conversion system of the present invention will be described.

Figure 7:
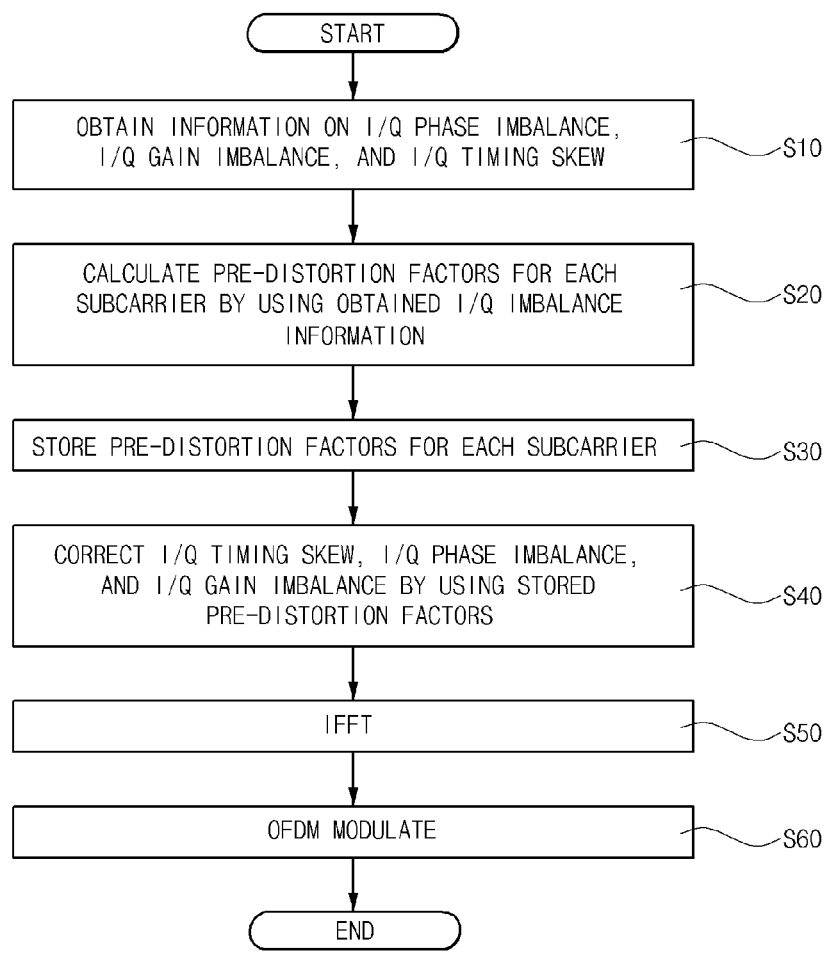
FIG. 7 is a flowchart illustrating a method of compensating for an I/Q imbalance in a direct up-conversion system of the present invention.

FIG. 7 is a flowchart illustrating the method of compensating for an I/Q imbalance in the direct up-conversion system of the present invention.

First, a general method of decreasing the performance deterioration resulting from the I/Q imbalance in the direct up-conversion communication system is to inversely pre-distort the I/Q imbalance for a baseband signal by using the measured I/Q imbalance of the system and remove the I/Q imbalance in a final output.

In this process, since the pre-distortion of an I/Q timing skew is realistically very difficult in a time domain, the OFDM system pre-distorts the I/Q imbalance including the I/Q timing skew in a previous stage of an IFFT by using the characteristic of the OFDM.

To this end, the I/Q gain imbalance g, the I/Q phase imbalance Φ, and the I/Q timing skew τ measured in the direct up-conversion system are first fetched from the outside in step S10. The pre-distortion factors A, B, C, and D for each subcarrier to pre-distort each subcarrier are calculated by using the fetched I/Q imbalance information in step S20. Steps S10 and S20 may be performed by the I/Q imbalance pre-distorter 110 and the pre-distortion factor calculator 112. In the meantime, the pre-distortion factors, A, B, C, and D for each subcarrier may be calculated through Equation 6.

In the meantime, since the pre-distortion factors, A, B, C, and D have different values for each subcarrier, the pre-distortion factors, A, B, C, and D have an N number of values, respectively, in a case of the OFDM system using an N-point FFT. In consideration of such a fact, the calculated values of the pre-distortion factors, A, B, C, and D are stored in the pre-distortion factor storage unit 114 in step S30.

In the meantime, the I/Q imbalance in the direct up-conversion system is a hardware dependent value, so that it has a fixed value in a single system. Accordingly, the pre-distortion factors are calculated and stored once at the time of the initialization of the system.

Next, the pre-distortion factors A, B, C, and D for each subcarrier are fetched from the pre-distortion factor storage unit 114, and then the pre-distortion is executed for each subcarrier, i.e. the I/Q timing skew, the I/Q phase imbalance, and the I/Q gain imbalance are pre-corrected, by using Equation 7 in step S40. Step S40 may be performed by the pre-distortion executer 116. In the meantime, the pre-distortion in the frequency domain uses the subcarriers which are bilaterally symmetric to each other with respect to the DC subcarrier.

When it is assumed that a subcarrier index, which is symmetric to a subcarrier index $f_m$, is $f_{-m}$, the pre-distortion baseband I/Q signals of the subcarrier index $f_m$ may be obtained by Equation 8.

Finally, the pre-distorted I/Q signals undergo the IFFT in step S50 and are modulated to OFDM signals in step S60.

INDUSTRIAL APPLICABILITY

The apparatus and the method of compensating for the I/Q imbalance in the direct up-conversion system of the present invention is not limited to the aforementioned embodiment, and may be variously modified and implemented within the scope of the technical spirit of the present invention.

The invention claimed is:

1. An In-phase/Quadrature-phase (I/Q) imbalance compensation apparatus in a direct up-conversion system, the I/Q imbalance compensation apparatus comprising:
    a pre-distortion factor calculator for fetching pre-measured I/Q imbalance factors and calculating pre-distortion factor A, B, C and D; and
    a pre-distortion executer for executing a pre-distortion for each subcarrier through the distortion factors A, B, C and D corresponding to each subcarrier,
    wherein the pre-distortion factors A, B, C and D are calculated by the following equations, $$Phase_{timing\_skew} = 2*\pi*\left(\text{subcarrier index} - \left(\frac{N}{2}-1\right)\right)*\Delta f*\tau$$

$$\frac{N}{2} \le \text{subcarrier index} < N \text{ point } FFT$$

$$A = 0.5 * [(1+g)*\cos(\phi) + (1-g) +$$
$$\cos(\phi)*\cos(Phase_{timing\_skew}) - (1+g)*\sin(\phi)*\sin(Phase_{timing\_skew})]$$

$$B = 0.5 * [(g-1)*\sin(\phi) + (1-g) + \cos(\phi)*\sin(Phase_{timing\_skew}) +$$
$$(1+g)*\sin(\phi)*\cos(Phase_{timing\_skew})]$$

$$C = 0.5 * [(1+g)*\cos(\phi) - (1-g) + \cos(\phi)*\cos(Phase_{timing\_skew}) -$$
$$(1+g)*\sin(\phi)*\sin(Phase_{timing\_skew})]$$

-continued
$$D = 0.5 * [(g-1)*\sin(\phi) + (1-g) + \cos(\phi)*\sin(Phase_{timing\_skew}) -$$
$$(1+g)*\sin(\phi)*\cos(Phase_{timing\_skew})]$$

in which τ indicates I/O timing skew, g indicates an I/O gain imbalance, φ indicates an I/O phase imbalance, Δf indicates sampling rate/FFT size, and N indicates a positive integer equal to an FFT size.

2. The I/Q imbalance compensation apparatus as claimed in claim 1, wherein the direct up-conversion system is applied to an Orthogonal Frequency Domain Multiple (OFDM) system.

3. The I/Q imbalance compensation apparatus as claimed in claim 2, further comprising a pre-distortion factor storage unit for storing the pre-distortion factors calculated by the pre-distortion factor calculator,
wherein the pre-distortion executer fetches the pre-distortion factors calculated by the pre-distortion factor calculator to execute the pre-distortion.

4. The I/Q imbalance compensation apparatus as claimed in claim 2, wherein the pre-distortion executer performs the pre-distortion for respective subcarriers bilaterally symmetric to each other with respect to a DC subcarrier, and the pre-distortion is performed by Predistorted_$I(f_m)=A(f_m)\cdot I(f_m)+B(f_m)\cdot Q(f_m)+C(f_m)\cdot I(f_{-m})+D(f)\cdot Q(f_{-m})$ Predistorted_$Q(f_m)=A(f_m)\cdot Q(f_m)-B(f_m)\cdot I(f_m)+D(f_m)\cdot I(f_{-m})-C(f)\cdot Q(f_{-m})$ and Predistorted_$I(f_{-m})=A(f_{-m})\cdot I(f_{-m})+B(f_{-m})\cdot Q(f_{-m})+C(f_{-m})\cdot I(f_m)+D(f_{-m})\cdot Q(f_m)$ Predistorted_$Q(f_{-m})=A(f_{-m})\cdot Q(f_{-m})-B(f_{-m})\cdot I(f_{-m})+D(f_{-m})\cdot I(f_m)-C(f_{-m})\cdot Q(f_m)$, in which $f_m$ indicates a predetermined subcarrier index, and $f_{-m}$ indicates a subcarrier index symmetric to $f_m$.

5. A direct up-conversion system comprising:
the I/Q imbalance compensation apparatus for performing a pre-distortion so as to compensate for an I/Q imbalance for baseband digital I signals and baseband digital Q signals as claimed in claim 1;
a baseband processor comprising an IFFT (Inverse Fast Fourier Transformation) unit for performing an IFFT on I signals and Q signals pre-distorted by the I/Q imbalance compensation apparatus;
a D/A converter for converting I signals and Q signals which have undergone the IFFT to analog data; and
an I/Q modulator for I/Q modulating the analog data.

6. A method of compensating for an I/O imbalance in a direct up-conversion system, the method comprising the steps of:
(a) calculating pre-distortion factors A, B, C and D for each subcarrier by using pre-measured I/O gain imbalance g, I/O phase imbalance φ, and I/O timing skew τ(timing_skew);
(b) execute a pre-distortion for each subcarrier through the calculated pre-distortion factors A, B, C and D for each subcarrier,
(c) performing an IFFT on pre-distorted I/O signals, and
(d) converting I signals and Q signals which have undergone and IFFT to analog data and I/O modulating the analog data,
wherein the pre-distortion factors A, B, C and D are calculated by the following equations, $$Phase_{timing\_skew} = 2*\pi*\left(\text{subcarrier index} - \left(\frac{N}{2}-1\right)\right)*\Delta f*\tau$$

$$\frac{N}{2} \le \text{subcarrier index} < N \text{ point } FFT$$

$$A = 0.5 * [(1+g)*\cos(\phi) + (1-g) +$$
$$\cos(\phi)*\cos(Phase_{timing\_skew}) - (1+g)*\sin(\phi)*\sin(Phase_{timing\_skew})]$$

$$B = 0.5 * [(g-1)*\sin(\phi) + (1-g) + \cos(\phi)*\sin(Phase_{timing\_skew}) +$$
$$(1+g)*\sin(\phi)*\cos(Phase_{timing\_skew})]$$

$$C = 0.5 * [(1+g)*\cos(\phi) - (1-g) + \cos(\phi)*\cos(Phase_{timing\_skew}) -$$
$$(1+g)*\sin(\phi)*\sin(Phase_{timing\_skew})]$$

$$D = 0.5 * [(g-1)*\sin(\phi) + (1-g) + \cos(\phi)*\sin(Phase_{timing\_skew}) -$$
$$(1+g)*\sin(\phi)*\cos(Phase_{timing\_skew})]$$

in which τ indicates I/O timing skew, g indicates an I/O gain imbalance, φ indicates an I/O phase imbalance, Δf indicates sampling rate/FFT size, and N indicates a positive integer equal to an FFT size.

7. The method as claimed in claim 6, further comprising a step of storing the pre-distortion factors calculated in the step of (a) before the step of (b),
wherein the step of (b) is performed by fetching the stored pre-distortion factors.

8. The method as claimed in claim 7, wherein the step of (b) is performed for respective subcarriers bilaterally symmetric to each other with respect to a DC subcarrier, and the pre-distortion is performed by Predistorted_$I(f_m)=A(f_m)\cdot I(f_m)+B(f_m)\cdot Q(f_m)+C(f_m)\cdot I(f_{-m})+D(f)\cdot Q(f_{-m})$ Predistorted_$Q(f_m)=A(f_m)\cdot Q(f_m)-B(f_m)\cdot I(f_m)+D(f_m)\cdot I(f_{-m})-C(f)\cdot Q(f_{-m})$ and Predistorted_$I(f_{-m})=A(f_{-m})\cdot I(f_{-m})+B(f_{-m})\cdot Q(f_{-m})+C(f_{-m})\cdot I(f_m)+D(f_{-m})\cdot Q(f_m)$ Predistorted_$Q(f_{-m})=A(f_{-m})\cdot Q(f_{-m})-B(f_{-m})\cdot I(f_{-m})+D(f_{-m})\cdot I(f_m)-C(f_{-m})\cdot Q(f_m)$, in which $f_m$ indicates a predetermined subcarrier index, and $f_{-m}$ indicates a subcarrier index symmetric to $f_m$.

9. The method as claimed in claim 6, wherein the method is applied to an OFDM system.

10. The method as claimed in claim 7, wherein the method is applied to an OFDM system.

11. The method as claimed in claim 8, wherein the method is applied to an OFDM system.

* * * * *